United States Patent
Marvasti et al.

(10) Patent No.: US 9,547,710 B2
(45) Date of Patent: Jan. 17, 2017

(54) METHODS FOR THE CYCLICAL PATTERN DETERMINATION OF TIME-SERIES DATA USING A CLUSTERING APPROACH

(75) Inventors: Mazda A. Marvasti, Rancho Santa Margarita, CA (US); Astghik Grigoryan, Yerevan (AM); Arnak Poghosyan, Yerevan (AM); Naira Grigoryan, Yerevan (AM); Ashot Harutyunyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 1435 days.

(21) Appl. No.: 12/186,494

(22) Filed: Aug. 5, 2008

(65) Prior Publication Data
US 2010/0036643 A1 Feb. 11, 2010

(51) Int. Cl.
| G06F 7/00 | (2006.01) |
| G06F 17/30 | (2006.01) |
| G06Q 40/00 | (2012.01) |
| H04L 29/08 | (2006.01) |

(52) U.S. Cl.
CPC ... *G06F 17/30598* (2013.01); *G06F 17/30548* (2013.01); *G06Q 40/00* (2013.01); *H04L 67/22* (2013.01)

(58) Field of Classification Search
CPC ............ G06F 17/30548; G06F 17/30598
USPC ........ 707/737, 758, 776, 10; 706/12; 702/44
See application file for complete search history.

(56) References Cited

U.S. PATENT DOCUMENTS

| 4,954,981 | A | * | 9/1990 | Dehner et al. ............... 345/440 |
| 5,864,855 | A | * | 1/1999 | Ruocco et al. |
| 6,609,085 | B1 | * | 8/2003 | Uemura et al. ............... 702/189 |
| 6,862,540 | B1 | * | 3/2005 | Welch et al. ................... 702/44 |
| 7,251,589 | B1 | * | 7/2007 | Crowe et al. ................. 702/189 |
| 7,346,595 | B2 | * | 3/2008 | Aoyama et al. ............... 706/25 |
| 7,369,961 | B2 | * | 5/2008 | Castelli et al. ............... 702/176 |
| 7,711,734 | B2 | * | 5/2010 | Leonard ........................ 707/736 |
| 2003/0074251 | A1 | * | 4/2003 | Kumar ................. G06Q 10/087 705/7.29 |
| 2003/0101009 | A1 | * | 5/2003 | Seem .............................. 702/61 |
| 2004/0088722 | A1 | * | 5/2004 | Peker .............................. 725/19 |
| 2004/0221855 | A1 | * | 11/2004 | Ashton ........................ 128/898 |
| 2006/0271533 | A1 | * | 11/2006 | Sakurai et al. ................... 707/5 |
| 2006/0282457 | A1 | * | 12/2006 | Williams ...................... 707/102 |
| 2009/0198640 | A1 | * | 8/2009 | To ........................ G06N 99/005 706/52 |
| 2010/0023497 | A1 | * | 1/2010 | Magdy ................. G06K 9/6251 707/E17.136 |

OTHER PUBLICATIONS

Todd Wittman Dec. 2002. Time-Series Clustering and Association Analysis of Financial Data, CS 8980 Project.*

(Continued)

*Primary Examiner* — James Trujillo
*Assistant Examiner* — John J Morris

(57) ABSTRACT

Cycles and other patterns within time-series data are determined. Time-series data are transformed into discretized sets of clustered data that are organized by time period. Comparison is made of the organized data to determine similar time periods and multiclusters of the similar time periods are formed. From the multicluster data, cycles are identified from which thresholds and other useful data may be derived, or the data used for other useful purposes.

10 Claims, 15 Drawing Sheets

(56) References Cited

OTHER PUBLICATIONS

Singhal, A. and Seborg, D. E. (2005), Clustering multivariate time-series data. Journal of Chemometrics, 19: 427-438. doi: 10.1002/cem.945.*

T. Warren Liao; Clustering of time series data—a survey; Nov. 2005; Journal—Pattern Recognition vol. 38 issue 11.*

* cited by examiner

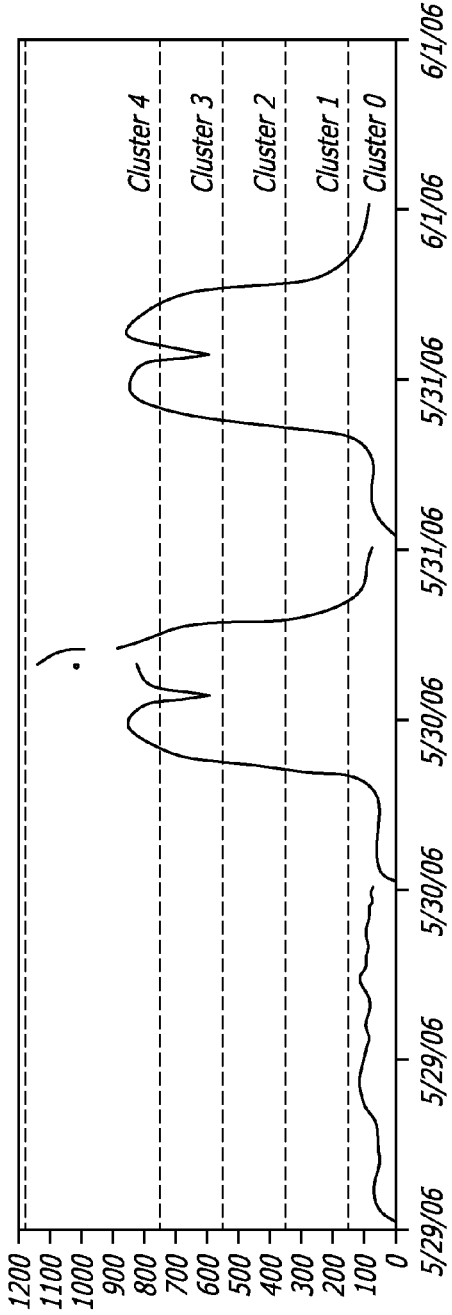
FIG. 4A
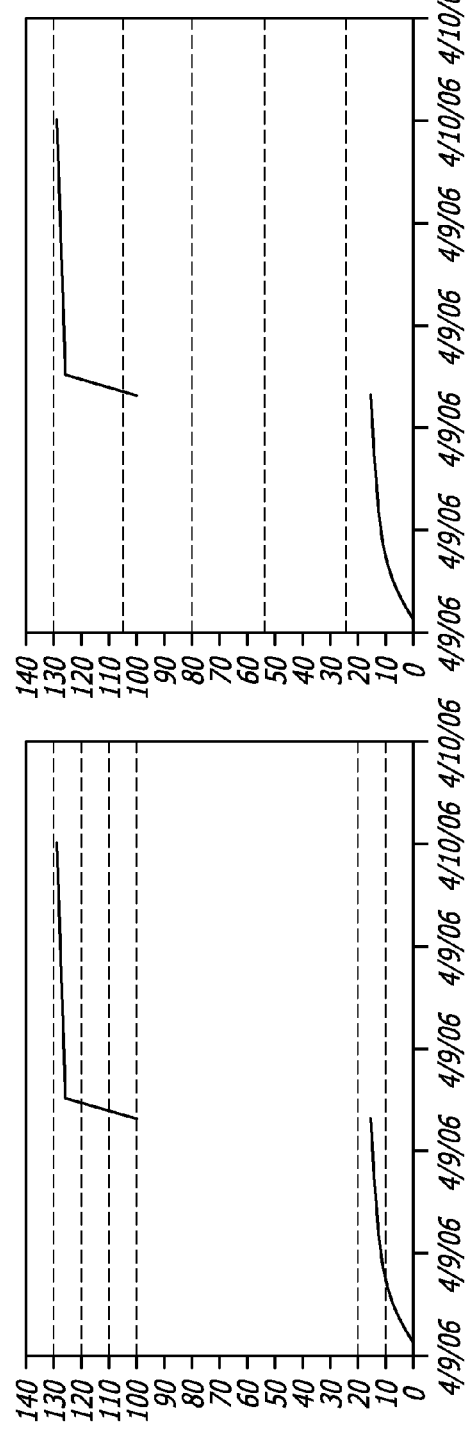
FIG. 4B
FIG. 4C $\bar{s}_{t_1} = \{ [0,0,1,1,1], t_1 \}$ $\bar{s}_{t_2} = \{ [1,1,1,1,0], t_2 \}$ $\bar{s}_{t_3} = \{ [0,0,1,1,0], t_3 \}$

| Time Stamp | Metric Value | Cluster Index |
|---|---|---|
| 01/02/2006 1:01 AM | 1360 | 3 |
| 01/02/2006 1:03 AM | 21 | 0 |
| 01/02/2006 1:05 AM | 22 | 0 |
| 01/02/2006 1:21 AM | 33 | 0 |
| 01/02/2006 1:23 AM | 35 | 0 |
| 01/02/2006 1:25 AM | 370 | 1 |
| 01/02/2006 1:27 AM | 390 | 1 |
| 01/02/2006 1:29 AM | 41 | 0 |
| 01/02/2006 1:31 AM | 42 | 0 |
| 01/02/2006 1:33 AM | 44 | 0 |
| 01/02/2006 1:35 AM | 3736 | 8 |
| 01/02/2006 1:37 AM | 2047 | 4 |
| ... | ... | ... |

FIG. 6B

| Cluster Index | Min | Max |
|---|---|---|
| 0 | 0 | 334 |
| 1 | 335 | 709 |
| 2 | 710 | 1086 |
| 3 | 1087 | 1558 |
| 4 | 1559 | 2148 |
| 5 | 2149 | 2722 |
| 6 | 2723 | 3257 |
| 7 | 3258 | 3729 |
| 8 | 3730 | 5096 |
| 9 | 5097 | 6976 |

FIG. 6A

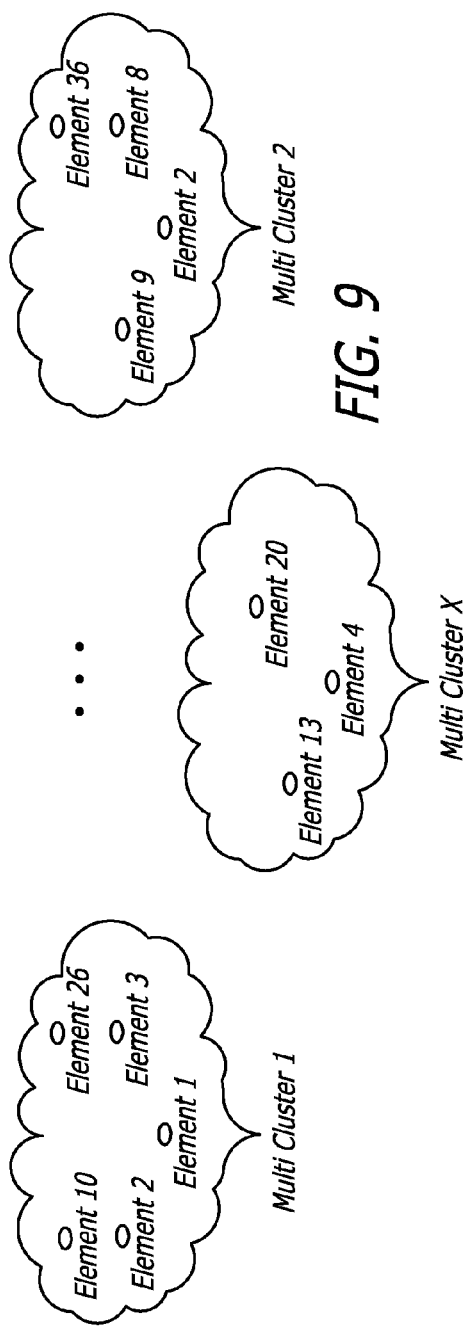

FIG. 13

List of Cycles

| |
|---|
| Period=7; Day=1 P%=100.00%, Multi Cluster=1 |
| Period=7; Day=2 P%=90.91%, Multi Cluster=1 |
| Period=7; Day=0 P%=85.71%, Multi Cluster=3 |
| Period=7; Day=3 P%=81.82%, Multi Cluster=3 |
| Period=7; Day=4 P%=85.71%, Multi Cluster=3 |
| Period=7; Day=5 P%=92.86%, Multi Cluster=3 |
| Period=7; Day=6 P%=92.31%, Multi Cluster=3 |

| |
|---|
| Period=14; Day=2 P%=100.00%, Multi Cluster=1 |
| Period=14; Day=3 P%=100.00%, Multi Cluster=1 |
| Period=14; Day=9 P%=100.00%, Multi Cluster=1 |
| Period=14; Day=10 P%=100.00%, Multi Cluster=1 |
| Period=14; Day=0 P%=100.00%, Multi Cluster=3 |
| Period=14; Day=1 P%=100.00%, Multi Cluster=3 |
| Period=14; Day=4 P%=100.00%, Multi Cluster=3 |
| Period=14; Day=5 P%=100.00%, Multi Cluster=3 |
| Period=14; Day=6 P%=100.00%, Multi Cluster=3 |
| Period=14; Day=7 P%=100.00%, Multi Cluster=3 |
| Period=14; Day=8 P%=100.00%, Multi Cluster=3 |
| Period=14; Day=13 P%=100.00%, Multi Cluster=3 |

METHODS FOR THE CYCLICAL PATTERN DETERMINATION OF TIME-SERIES DATA USING A CLUSTERING APPROACH

BACKGROUND

This disclosure relates to methods for determining cyclical patterns in time-series date (i.e., one or more data indicators tracked over a time period).

SUMMARY

Cycles and other patterns within time-series data are determined. Time-series data are transformed into discretized sets of clustered data that are organized by time period. Comparison is made of the organized data to determine similar time periods and multiclusters of the similar time periods are formed. From the multicluster data, cycles are identified from which thresholds and other useful data may be derived, or the data used for other useful purposes.

According to a feature of the present disclosure, a method is disclosed comprising: obtaining a set of time-series data; clustering the time-series data into at least one cluster; organizing the clustered time-series data into a data structure that, on a per time period basis, indicates the clusters having time-series data for each time period; and recognizing at least one cycle from the clustered time-series data by comparing the clusters to identify similar time periods, multiclustering the time periods, discretizing the multiclusters, and determining from the discretized multiclusters at least one cycle.

According to a feature of the present disclosure, a method is disclosed comprising recognizing at least one cycle from the clustered time-series data by comparing the clusters to identify similar time intervals, multiclustering the time intervals to form multiclusters of similar time intervals, discretizing the multiclusters to form a discretized multicluster array, and determining from the discretized multicluster array at least one cycle.

According to a feature of the present disclosure, a method is disclosed comprising obtaining a set of time-series data, clustering the time-series data, discretizing the clustered time-series data, creating at least one time interval. The clustering comprises clustering the data according to a clustering method and discretizing the data.

DRAWINGS

The above-mentioned features and objects of the present disclosure will become more apparent with reference to the following description taken in conjunction with the accompanying drawings wherein like reference numerals denote like elements and in which:

FIGS. 4A-4C are graphs of implementations of time-series data divided into clusters;

FIGS. 6A-6C are illustrations of examples of implementations of methods of the present disclosure to transform sets of hypothetical time-series data;

FIG. 9 is an illustration of an implementation of multiclustering time periods having similar data patterns;

FIG. 10 is an illustration of an implementations of an organization of multiclustered time-series data to aid in determination of cycles;

FIG. 13 is an illustration of an implementation of cycles from which the cycles are reduced to prevent groups of repetitive cycles.

DETAILED DESCRIPTION

In the following detailed description of embodiments of the present disclosure, reference is made to the accompanying drawings in which like references indicate similar elements, and in which is shown by way of illustration specific embodiments or implementations in which the present disclosure may be practiced. These embodiments are described in sufficient detail to enable those skilled in the art to practice the present disclosure, and it is to be understood that other embodiments may be utilized and that logical, mechanical, electrical, functional, and other changes may be made without departing from the scope of the present disclosure. The following detailed description is, therefore, not to be taken in a limiting sense, and the scope of the present disclosure is defined only by the appended claims. As used in the present disclosure, the term "or" shall be understood to be defined as a logical disjunction (inclusive of the term "and") and shall not indicate an exclusive disjunction unless expressly indicated as such or notated as "xor."

The inventors discovered novel methods for determining cycles from time-series data irrespective of the expected variations that occur in sets of time-series data. Indeed, according to implementations of the present disclosure, sets of time-series data are transformed and aggregated into discrete time periods. Each time intervals is compared to other time intervals to determine time intervals having similar data. Observation of cycles may then be made based on the similar time intervals. These cycles of similar data are useful for determining appropriate thresholds and predicative models for the source of the data, and for other purposes as would be known and understood to a person of ordinary skill in the art.

To illustrate the utility of the methods of the present disclosure, hypothetical network usage time-series data for an exemplary stock trading business is presented and illustrated according to in FIG. 1. Accordingly, time-series data is shown representing hypothetical network usage in a business. During days one through five, the business is open and employees utilize the network resources. On the weekend, represented by days six and seven, most employees do not come to work unless there is a pressing issue that must be addressed over the weekend.

Figure 1A:
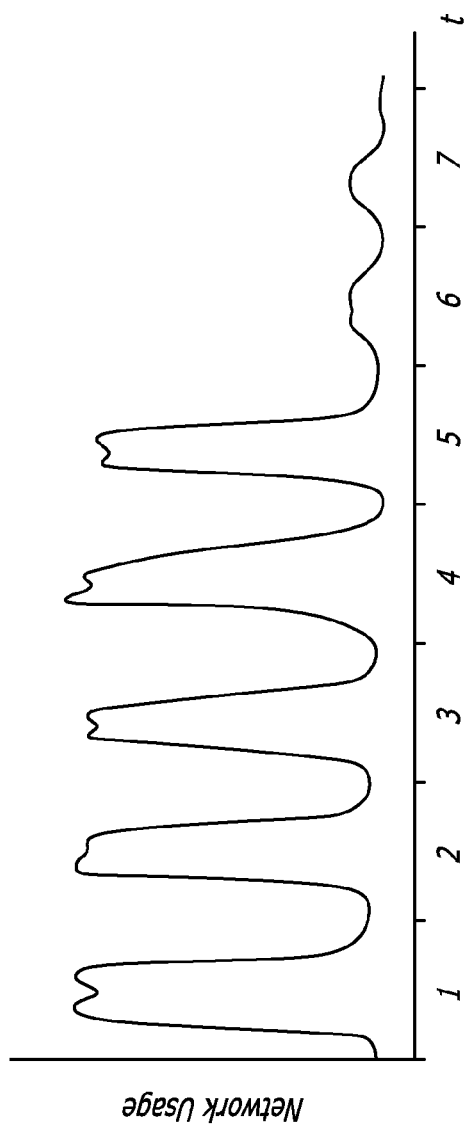
FIGS. 1A-1B are graphs of implementations of exemplary time-series data.

As observed in the network data of FIG. 1A, during the business hours of the business each weekday, a large increase in network activity is observed. Around the middle of each day, a slight dip in the network activity is also observed, corresponding to the decrease in network activity as lunch breaks are taken, followed by an increase in the network usage in the afternoon similar to that of the morning. At night, network usage decreases to a baseline level until the next work day as the employees are at home.

On the weekend, small increases are observed as a small percentage of employees come to work to address issues over the weekend. However, because the number of employees reporting to work is reduced, the network activity is similarly reduced.

As observed in FIG. 1A, the spikes each day, generally, but do not exactly resemble one another. For example, the maximum network usage on Friday is illustrated as slightly less than that of the other weekdays because some employees are getting a head start on the weekend and the overall workforce reporting to work is decreased on that Friday. Similar variations in the data for each day is observable depending on the activities in the office, such as meetings, socials, or projects that do not require network usage. For example, on day 2 the network usage during the dip in the middle of the day is observed to be greater than that of the other work days, perhaps due to working through a lunch period, for example.

Variations in these types of data sets are expected. However, for the purpose of setting thresholds for real-time data observations to alert of problems states, such variations prove troublesome because spikes and other data that appear to be outside of the average have the potential to trigger alarms. For example, if the data for all seven days were averaged to determine the average network usage at noon for any given day, the lack of network usage over the weekend would skew the average thereby causing every noon to be an alarm state. However, the weekend data cannot be omitted because the real-time monitoring of the data must also be performed on the weekend to catch abnormal behavior during the weekend hours.

Figure 1B:
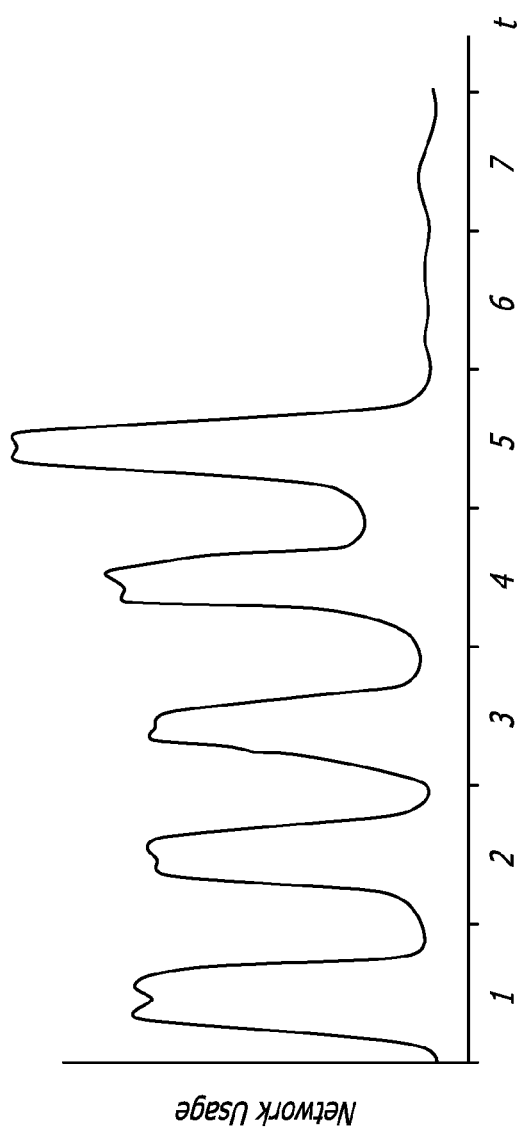

Moreover, certain time periods fall far outside of the average ranges, but are expected and considered to be normal. For example, during the triple witching hours that occur on the last Friday of every March, June, September, and December in the United States stock markets, certain securities expire, which might greatly increase network usage on those Friday as illustrated in FIG. 1B. Indeed, the peak network usage on day 4 is slightly increased over normal, and the network activity during the nighttime hours between day 4 and day 5 is similarly slightly increased. The peak network activity on day 5 is around 33% greater than should be expected on normal Fridays. Yet the increased network activity is entirely expected.

Thresholds and other predictive functions must account for the day to day variations, as well as the abnormal, yet expected, variations that occur in regular time-series data. To more accurately predict thresholds, for example, the present inventors discovered that the thresholds can be varied based on cyclical patterns in the data to reflect even abnormal, yet expected, fluctuations in the time-series data.

For example, because triple witching Friday occurs four times a year, thresholds may be determined based solely on the four times a year cycle, creating a threshold "exception" for expected variation in the network usage data that would otherwise trigger alarm states. Additionally, because the large variation cycles are not included in the normal, day-to-day data sets, the thresholds for those days may be more accurately predicted and set, thereby alerting potential problem states more accurately.

Thus, the present disclosure relates to the recognition of cycles within time-series data sets. According to implementations illustrated in FIG. 2, the methods of the present disclosure comprise two general processes. The first is a transformation of the data by processing and structuring of raw time-series data in operation 200. According to implementations, the raw data is clustered, discretized, and organized into discrete time intervals. From these organized time intervals containing the clustered, discretized data, in operation 700, cycles are recognized. These general processes are described in detail below.

Processing and Structuring the Data

Figure 2:
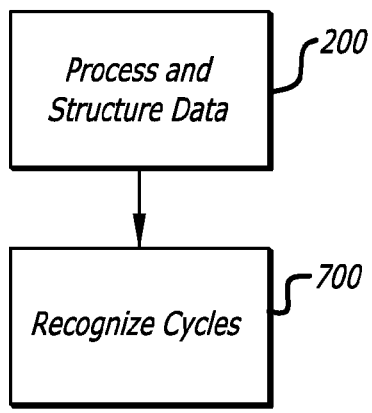
FIG. 2 is a flow diagram of an implementation of the present disclosure illustrating processing and structuring of time-series data prior to determining cycles from the time-series data.
Figure 3A:
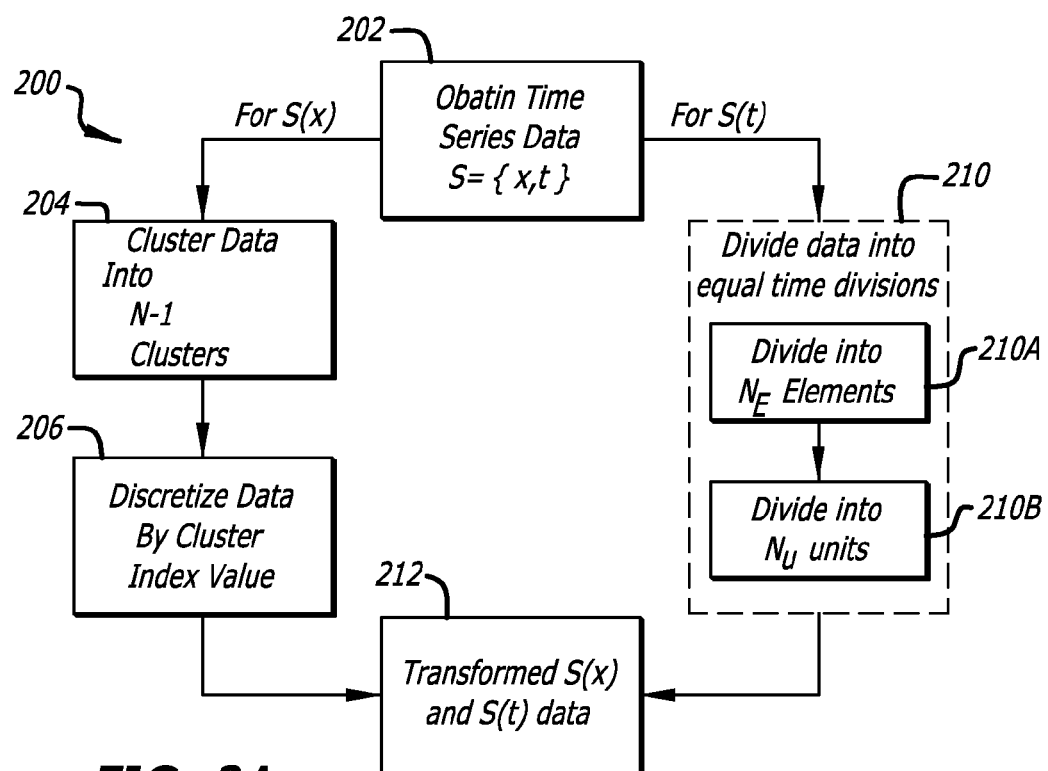
FIG. 3A is a flow diagram of an implementation of the present disclosure illustrating a method for processing and structuring time-series data for determination of cycles.

According to more specific implementations, FIG. 3A illustrates the general process of transforming the time-series data (operation 212) through processing and structuring (operation 200 of FIG. 2). Time-series data is obtained in operation 202. Generally, time-series data may be denoted by time-series data set S, which comprises the non-time data points x collected from a metric, associated with time data points t corresponding to time in which the non-time data was gathered, where S={x;t}. According to embodiments, the time-series data set may have data values for multiple metrics associated with each time. For example, each member of set S may contain a network usages value, a CPU usage value, or other metric data, together with a time value. Generally, according to embodiments, cycles are determined on a metric by metric basis.

Each set of non-time data S(x), is clustered into a predetermined number of clusters in operation 204. Any clustering method is appropriate, for example K-means clustering. The result of the clustering step in operation 204 is a set of clusters denoted as C(x), where $$C(X) = \hat{C}S(x)$$

$$C(X) = \{c_i(x)\}$$

where i=0, 1, . . . , N−1 and $\hat{C}$ is an operator representing some clustering method, for example K-means clustering. In other words, when $\hat{C}$ is applied to the set S(x), then the data points in S(x) are grouped into clusters of related data represented by C(x). Note that the total number of clusters is N.

After the non-time data is clustered, it is discretized in operation 206. According to embodiments, discretization transforms the raw data in S(x) into values of the index of the cluster to which the data point was grouped in the clustering set. In other words, if $c_1(x)=156$ and was clustered into cluster 5 of 10 clusters, the value of $c_1(x)$ would be transformed from 156 to 5.

The discretization method may be denoted by operator $\hat{D}$. Consequently, when $\hat{D}$ is applied to the clusters (C(x)), a new set D where the raw data value has been replaced with the index value from the cluster to which each raw data point belongs is formed:

$$D \equiv \hat{D}C(x)$$

where $$D \in \{i\}_0^{N-1}$$

which denotes that each element in D is an index value corresponding to the cluster to which the raw non-time data points were clustered by operator $\hat{C}$. Thus, after discretization, the raw data values for the non-time data are replaced with the index reference for the cluster to which each raw non-time data belongs.

For example, turning to FIGS. 4A-4C, there are shown examples of time-series data with dashed lines exemplifying where clusters exist within the data depending the clustering method used. As illustrated in FIG. 4A, a set of time-series data is shown, as well as dashed lines representing the clustering of data. Cluster 4 is much larger than the other clusters and contains all of the largest data values, while the others are relatively constant in size. Artisans will readily observe that the time-series data need not be continuous.

In FIGS. 4B and 4C, the same data set is shown, but clustered by different methods. In FIG. 4B, for example, K-means clustering was used to cluster the data, which tended to capture the data into five clusters, where no cluster is present between 20 and 100, or above 130. In FIG. 4C, clusters were more simply created by compartmentalizing the data range in about equal slices.

According to embodiments, the time data from the $S \equiv \{x; t\}$ data set denoted S(t) is divided into discrete time intervals in operation 210 of FIG. 3A. According to embodiments and as will be readily appreciated by artisans, S(t) may be divided into any number of time intervals. The more time units or the smaller the time intervals, the more granular the data to analyzed will be. Likewise, the less time units or the larger the time intervals, the less granular the data to be analyzed will be.

According to embodiments, for example, S(t) may be divided into two set of time intervals: elements and units. According to an exemplary embodiment as shown in FIG. 3A, the entire time period constituting S(t) is discretized (divided) into $N_E$ equal time elements in operation 210A, where each time element has the same cardinality (i.e., each time element is the same size as the other time elements). Alternately expressed:

$$E = \hat{E}S(t)$$

$$E = \{e_j\}\ j=1,2,\ldots,N_E$$

$$\|e_j\| = \|e_k\|$$

where $\hat{E}$ is an operator that divides S(t) into $N_E$ time elements ($e_j$) of equal size, where:

$$S(t) = \bigcup_{j=1}^{N_E} e_j.$$

Thus, the entire time period over which time and non-time data is measured belongs to set E.

With respect to the time intervals, it should be noted, according to embodiments, that the time intervals are continuous irrespective of how they are chosen, and that each begins where the last leaves off. As such, if $t_0$ is the start time for the entire data set and $t_f$ is the end time for the entire data set, and $\tau_j$ is the time interval of each element, then $$\tau_j \equiv \left[ t_0 + \frac{t_f - t_0}{N_E}(j-1),\ t_0 + \frac{t_f - t_0}{N_E}(j) \right)$$

where $$\frac{t_f - t_0}{N_E}$$

is the size of each element of time, and each of j−1 and j represent intervals. It should be noted, that the interval is inclusive of the first value for each $\tau_j$, the interval does not include the last value as represented in the equation above (shown by the open interval symbol); rather the last value is the start time of the next time interval.

After breaking the total time interval into elements, according to embodiments, each element is subdivided into equal sized units in operation 210B of FIG. 3A. Units can be of any size depending on the desired granularity. Represented mathematically:

$$U_j = \hat{U} e_j$$

$$U_j = \{u_{i,j}\}\ i=1,2,\ldots,N_U\ j=1,2,\ldots,N_E$$

$$\|u_{i,j}\| = \|u_{k,j}\|$$

where $\hat{U}$ is an operator that breaks each element into $N_U$ units of equal size, where:

$$e_j = \bigcup_{i=1}^{N_U} u_{i,j}.$$

Note that each unit is indexed by a unit index i and an element index j.

For example, according to embodiments each element may be a day and each unit an hour. Selection of days and hours represents user accessible time intervals in which cycles are measured. For example, with information systems-type data, days represent discrete intervals that are often cyclical from the standpoint of day and night usage, while hours represent time intervals of appropriate granularity to measure data from one or more metrics that provide a snapshot of the state of a system being measured, but allowing for the variances within the demands of the system during the day to be reflected (e.g., lunch breaks, employees who come in early to work, employees who stay late for work, etc.). Likewise, if a baseball game was the source of the data, each game might serve as a element and each inning or third of an inning a unit. Other suitable time periods depend on criteria such as the time intervals over which data is received (e.g., receiving data every 5 minutes versus every 5 seconds), the type of data set being observed, and the desired level of granularity necessary to be useful. Additionally, the principles of the present disclosure are adaptable to more or less than two discrete time intervals (i.e., more than elements and units, or just elements for example).

After both the time intervals are determined in operation 210 and the raw non-time data clustered and discretized in operations 204, 206, the discretized non-time data is "reassociated" with the unit and element from which it was originally gathered. Artisans will readily understand that the time data and the non-time data are not dissociated; the "dissociation" is for the purposes of explaining what is occurring with the non-time and time data herein.

During the "reassociation," the discretized non-time data is organized into per time interval (unit) arrays that indicate only the presence of data in a given cluster or the absence of data in the given cluster. The array has a length equal to the number of clusters in which the time-series data was clustered and each position in the array corresponds with one cluster. Each index of the cluster associated with the non-time data is mapped to a presence value in the time interval array at the location corresponding to the index of the cluster in the time interval array to which the data point belongs.

The set $\overline{S}$ represents the discretized data organized into elements and units.

$$\overline{S} = \{\overline{S}_j\}$$

$$\overline{S}_j = \{\overline{s}_{i,j}\}\ i=1,\ldots,N_U, j=1,\ldots,N_E$$

$$\overline{s}_{i,j} = (\gamma_{i,j}, u_i)$$

According to embodiments, the vector $\gamma_{i,j}$ is an array containing N elements corresponding to each cluster, where each element has a value of 0 or 1, where 1 indicates that the data of the time interval $u_i$ belongs to that cluster in that time period and 0 indicates that no data belongs to the given cluster over the data period. $u_i$ is a time interval, for example a unit. Stated another way: a 1 in $\gamma_{i,j}$ indicates that for the specified cluster index (0, ..., N−1), data values existed from D for time $u_i$. A 0 indicates that no such data was available for the specified time interval.

Figure 3B:
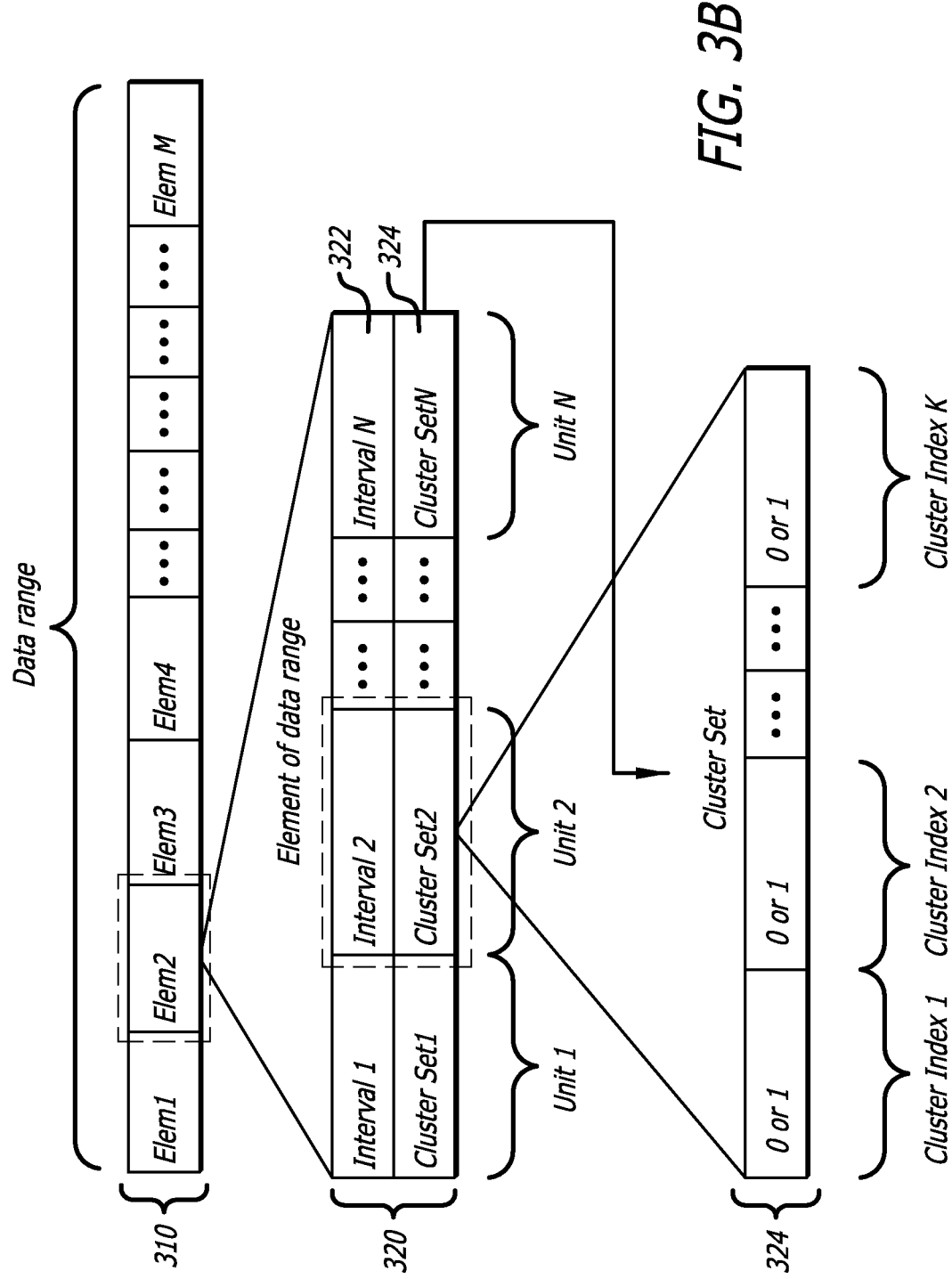
FIG. 3B is an illustration of an implementation of an transformation of time-series data.

FIG. 3B illustrates an embodiment of $\overline{s}_{i,j}$. According to FIG. 3B, a plurality of elements 310 are shown. Each element 310 comprises a plurality of units 320 and associated discretized non-time data values $\overline{s}_{i,j}$, according to exemplary embodiments. As illustrated, each unit 322 is associated with cluster set 324. Cluster sets 324 are arrays of discretized non-time data.

Figure 5A:
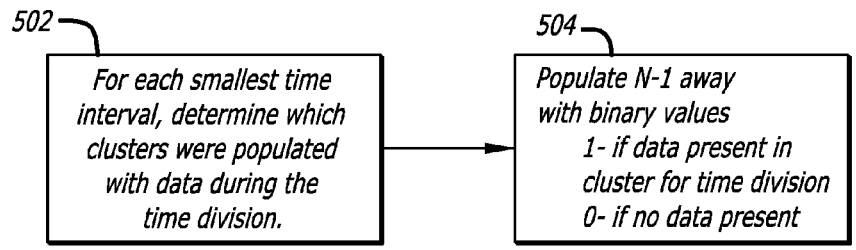
FIGS. 5A-5D are flow diagram of an implementation of an transformation of time-series data and three representative sets of data illustrating implementations of the methods of the present disclosure to transform sets of hypothetical time-series data.
Figure 5B:
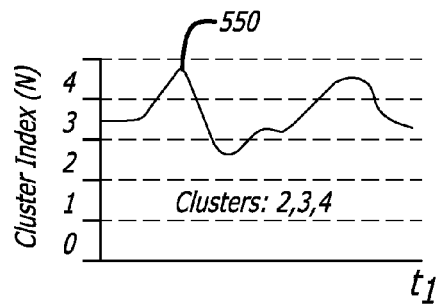
Figure 5C:
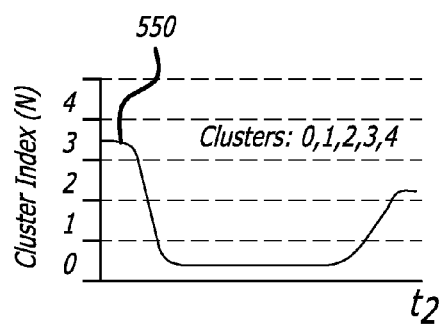
Figure 5D:
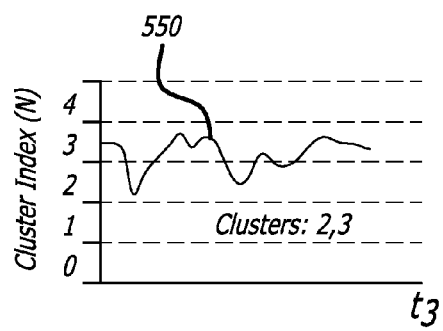

According to embodiments and as illustrated in FIG. 5A, each cluster set 324 comprises an array of N length, where N is the number of clusters the non-time data. For example, as shown in FIGS. 5B-5D, the non-time-series data are clustered into five clusters from κ to 4. Thus according to the example in FIGS. 5B-5D, the array for each cluster set would be five wide, one array location for each cluster.

To populate each array, the data is examined for each smallest time interval to determine which clusters (represented by the cluster indexes of the discretized non-time data) for the raw non-time within that interval in operation 502. For each array location in each smallest time interval, for example a unit, if the cluster index is present in the discretized non-time data, then the value of the array location corresponding to that cluster is set to 1, in operation 504. Otherwise, the value in the array location corresponding to a given cluster remains 0. According to other embodiments, other differentiation methods with respect to how the array is filled in and how the values differentiated are possible and contemplated within the scope of the present disclosure.

To better illustrate the process shown in FIG. 5A, exemplary data is shown in FIGS. 5B-5D for three time intervals corresponding to three smallest time intervals. As illustrated, the raw data is shown in the solid line of the graph in each of FIGS. 5B-5D. Along the y-axis of each graph are cluster breakpoints. If data exists in the range of a cluster, its raw data value was converted to the index value corresponding to its first cluster during the discretization process. For example, in the graph of FIG. 5B, the highest peak corresponds in y-value with cluster 4 and its raw value is therefore correlated with the cluster to which it belongs, which is 4 in this case. Likewise, while the lowest trough value is discretized with an index value of 2 because its raw data belongs to cluster 2.

Thus, for the time interval in FIG. 5B, the discretized non-time data contains indexes for clusters 2, 3, and 4 in one or more iterations (for example, if the time period is an hour and data measurements were taken every minute, there are multiple discretized non-time data belonging to cluster 2, to cluster 3, etc.). Because there were five clusters, the cluster set is an array of length five, which can be represented by:

$$[N_0, N_1, N_2, N_3, N_4]$$

where each N is a cluster. Because no data in the time unit is observed in clusters N=0 or N=1, the corresponding values in the array are set to zero, and the values corresponding to clusters N=2, N=3, and N=4 are set to 1 because their values are observed in the discretized data over the given time interval, producing a vector having the generated array for the given time interval:

$$[0,0,1,1,1]$$

Associating each cluster set array with its smallest time interval yields for the data shown in FIG. 5B:

$$\overline{s}_{t_1} = \{[0,0,1,1,1], t_1\}.$$

Likewise, for the data in the graph shown FIG. 5C, data exists in every cluster except cluster 4. Thus, the cluster set array is [1, 1, 1, 1, 0], and associated with the time index of smallest time interval to which it belongs $t_2$, would yield:

$$\overline{s}_{t_2} = \{[1,1,1,1,0], t_2\}$$

Finally, in FIG. 5D, large variation is observed in the data set over the time interval $t_3$. However, all of the data falls within clusters N=2 and N=3. Thus, the cluster set array is [0, 0, 1, 1, 0], and associated with the time index of its interval would yield:

$$\overline{s}_{t_3} = \{[0,0,1,1,0], t_3\}$$

In practice and according to embodiments, each non-time data point is not dissociated from its time element. Rather, the data is transformed and each unit and element of time aggregates a set of discretized data together with the time in which it was collected.

FIGS. 6A-6B graphically illustrate an example of the clustering, discretization, and cluster set formation processes. According to embodiments shown, a set of raw data is clustered in FIG. 6A. As shown, the clustering method determines a range of raw data values for each cluster. Of note, the clusters do not have to be of equal size, as illustrated elsewhere herein. FIG. 6B shows the result of the discretization process. For each raw data point collected, the metric value is correlated to the cluster to which it belongs and the metric value is replaced or collected together with the index of the cluster to which it belongs.

For example, the time stamp at 12:01 has a raw metric value of 1360. Referring to FIG. 6A, the cluster to which the raw metric value of 1360 belongs is cluster 3, which has a range of 1087-1558. Consequently, the raw value of 1360 for the time stamp 12:01 is replaced or complemented with the cluster index of 3, as shown.

Figure 6C:
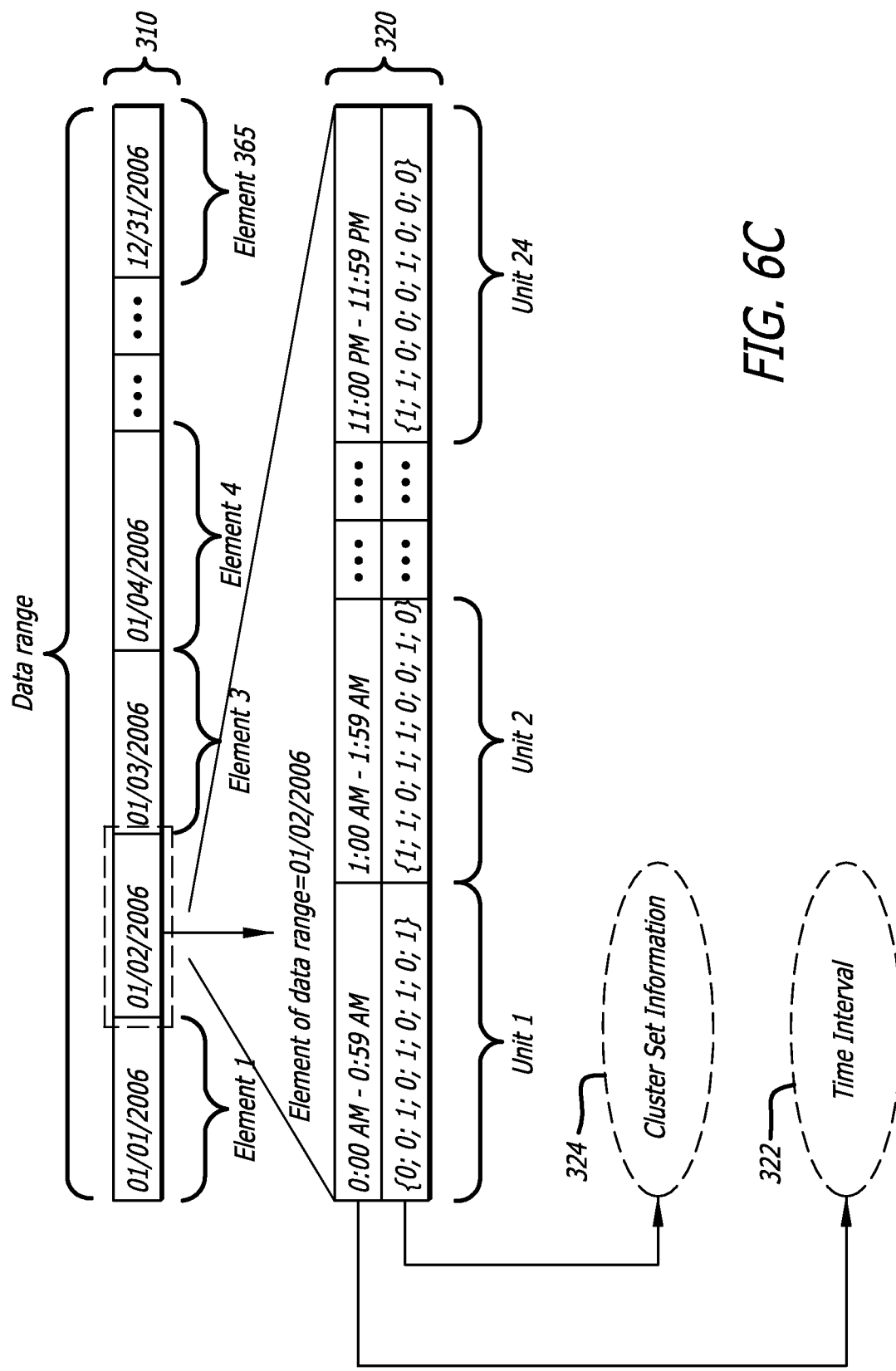

As shown in FIG. 6C, the entire data range is divided into time elements 310 of one day each for an entire year from Jan. 1, 2006 to Dec. 31, 2006. Each day is divided into 24 units 320 of one hour each. Looking at the Jan. 2, 2006 element, it is observed that each element has unit 322 and cluster set 324. The interval for each unit comprises one hour, starting at 0:00 AM (Unit 1) and ending at 11:59 PM (Unit 24).

Turning again to FIG. 6B, the raw data and transformed cluster index data for Jan. 2, 2006 is shown for the interval 1:01 AM-1:37 AM, where data was collected every two minutes (with a break in the data from 1:05 AM-1:25 AM). For the interval (assuming the data not shown comprising the rest of the hour have a cluster index value of 0), cluster indexes 0, 1, 3, 4, and 8 are present in the set. Turning again to the cluster data shown in Unit 2 of FIG. 6C, the cluster set array is [1; 1; 0; 1; 1; 0; 0; 1; 0] for the unit from 1:00 AM-1:59 AM in element Jan. 2, 2006.

Recognizing Patterns and Cycles from the Processed and Structured Data

Figure 7:
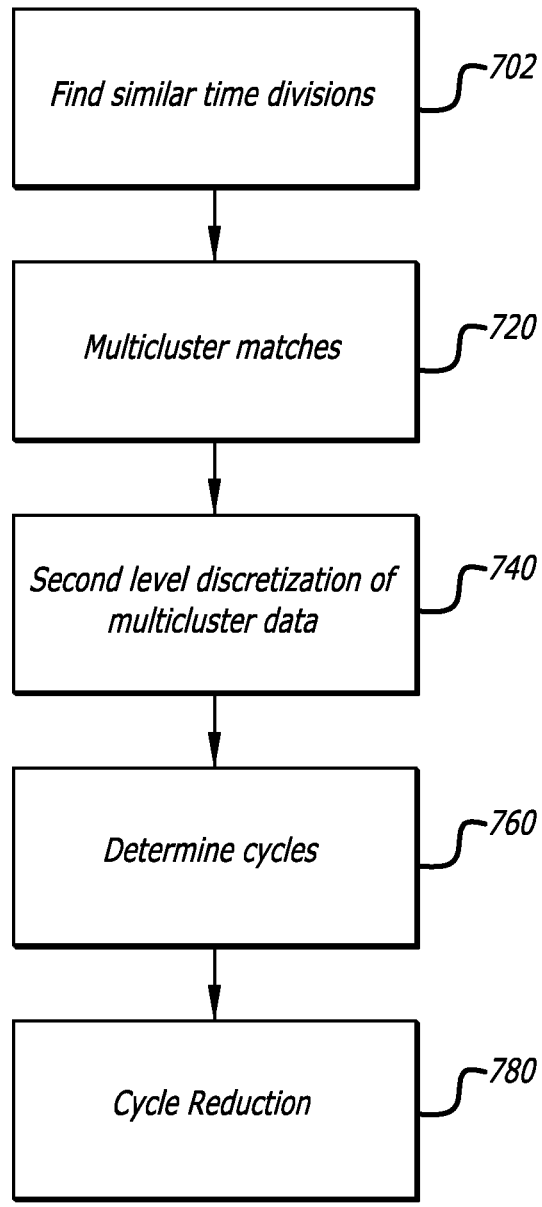
FIG. 7 is a flow diagram of an implementation for determining cycles from a set of transformed time-series data.

According to embodiments, the process of recognizing patterns or cycles in operation 700 of FIG. 2 is accomplished according to embodiments illustrated in FIG. 7. In operation 702, similar time divisions are determined by comparing cluster sets 324. After matches are determined, multiclusters of matching cluster sets 324 are determined in operation 720. After creation of the multiclusters, the sets of multi-clustered data is again discretized in operation 740, followed by cycle determination in operation 760. Finally, according to embodiments, the same general cycle may be recognized at different intervals (e.g., a cycle recognized every three days, might also show up as a 6 day cycle or a 9 day cycle, but are the same cycle). Therefore, in operation 780 these cycles are reduced so as not to have multiple cycles existing for the same occurrence in the data.

Figure 8A:
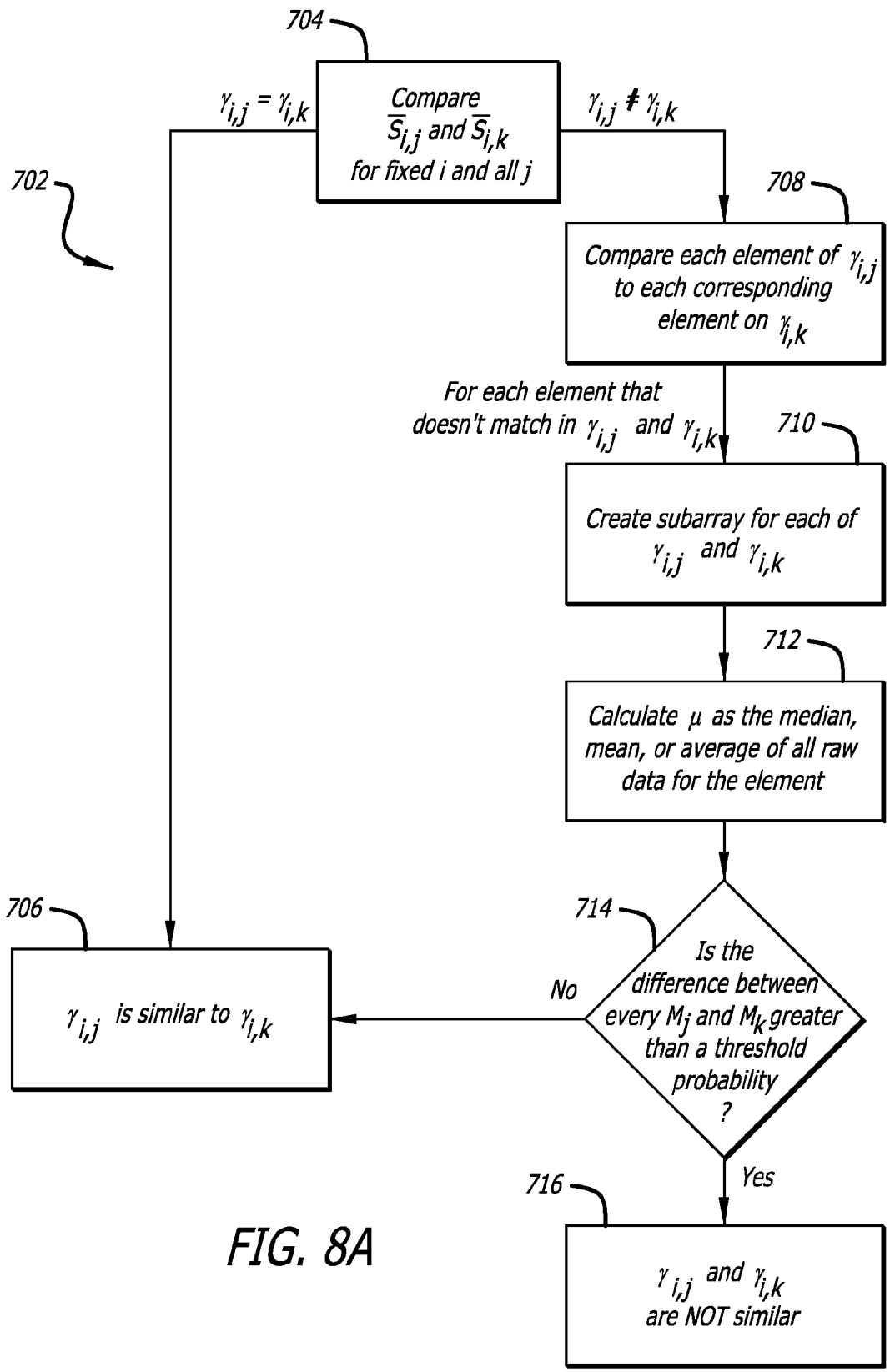
FIG. 8A is a flow diagram of an implementation for identifying instances of time-series data that are similar on a time period basis to be able to isolate cycles based on similar data observed per time period.

According to embodiments and as illustrated in FIG. 8A, each cluster set ($\gamma_{i,j}$) is compared for fixed units (smallest time intervals, e.g., a unit) for all elements (larger time intervals, e.g., an element) in operation 704. For example, the comparisons of each cluster set are for all of the same time unit (e.g., midnight to 1:59 am) for every element (e.g., day). Recalling that $\bar{s}_{i,j}$ comprises a cluster set $\gamma_{i,j}$ and a smallest time interval (unit) $u_j$, then $\bar{s}_{i,j}$ is compared to each $\bar{s}_{i,k}$, where j, k are the indexes of the units and i is the index of the element.

If the cluster sets ($\gamma_{i,j}$ and $\gamma_{i,k}$) are exactly the same, then the cluster sets are identical and are deemed to be similar in operation 706. For a cluster set to be identical to another cluster set, the array comprising the cluster set will be exactly the same on a position by position basis. Thus, at position one in the array, both cluster sets have the same value, at position two both cluster sets have the same value, and so forth.

For the comparison of two cluster sets, if they are exactly the same (i.e., $\gamma_{i,j} = \gamma_{i,k}$), then the cluster sets are determined to be similar in operation 706.

However, cluster sets may be different, according to embodiments, yet close enough to be determined to be similar. For two cluster sets to be similar where the cluster set have at least one position that does not match the other cluster set (i.e., $\gamma_{i,j} \neq \gamma_{i,k}$), the element at each array position of $\gamma_{i,j}$ is compared to the element of each array position in $\gamma_{i,k}$ in operation 708. For each pair of elements from $\gamma_{i,j}$ and $\gamma_{i,k}$ that do not match, a subarray is formed around the non-matching position for each non-match in the comparison of $\gamma_{i,j}$ and $\gamma_{i,k}$ in operation 710.

The subarray for each cluster set comprises, according to embodiments, the m$-1^{th}$, m$^{th}$, and m$+1^{th}$ positions of each cluster set (each subarray is denoted as $\eta_{m,i,j}$ and $\eta_{m,i,k}$, respectively). In other words, the non-matching array position m and its surrounding positions are contained in each subarray to determine if, despite the non-match, the cluster set are still similar. In the case where m is the first position of the cluster sets, the subarray will contain the m$^{th}$ and m$+1^{st}$ positions; in the case where m is the last position of the cluster sets, the subarray will contain the m$^{th}$ and m$-1^{st}$ positions, according to embodiments. According to other embodiments, the subarrays contain the m$^{th}$, m$+1^{st}$, and m$+2^{nd}$ or the m$^{th}$, m$-1^{st}$, and m$-2^{nd}$ positions. Other variations may also be used as would be known and understood by artisans.

For each subarray and $\eta_{m,i,j}$ and $\eta_{m,i,k}$, the median, mean, or average of the raw data corresponding to the certain positions in the subarray are computed for all raw data belonging to the cluster from which the data was derived in operation 712. The median, mean, or average is denoted by $\mu_{l,n}$, where l is the position within the cluster set array and n represents the relative cluster sets. In other words, $\mu_{l,n}$ represents the median, mean, or average for a given array position in each element in a cluster. Computation of the median, mean, or average allows for a direct comparison between the raw data of two elements that have non-matching cluster set positions, and determination of whether the difference between the median, mean, or average raw data values between the elements being compared in the subarrays is below a given threshold probability p.

Comparison using the raw values accounts for adjacent data points that are clustered into different clusters, but in actuality be very close from a raw data standpoint. Thus, even though the data points are in different clusters, the method checks to see whether the difference in clustering falls within an acceptable range of error, and if so, treats the differential clustering as if they were in the same cluster.

According to embodiments, matches are made using the following table in operation 714:

TABLE 1

Determination of similar subarrays.

| $\eta_{m,i,j}$ | $\eta_{m,i,k}$ | $\eta_{m,i,j}$ is similar to $\eta_{m,i,k}$ if and only if: |
|---|---|---|
| {1, 0, 0} | {0, 1, 0} | $\frac{\mu_{k,2} - \mu_{j,1}}{\mu_{j,1}} \leq p$ |
| {0, 1, 0} | {1, 0, 0} | $\frac{\mu_{j,2} - \mu_{k,1}}{\mu_{k,1}} \leq p$ |
| {0, 1, 0} | {0, 0, 1} | $\frac{\mu_{k,3} - \mu_{j,2}}{\mu_{j,2}} \leq p$ |
| {1, 1, 0} | {1, 0, 0} | $\frac{\mu_{j,2} - \mu_{k,1}}{\mu_{k,1}} \leq p$ |
| {0, 1, 1} | {0, 0, 1} | $\frac{\mu_{k,3} - \mu_{j,2}}{\mu_{j,2}} \leq p$ |
| {1, 1, 0} | {1, 0, 1} | $\frac{\mu_{j,2} - \mu_{k,1}}{\mu_{k,1}} \leq p$ and $\frac{\mu_{k,3} - \mu_{j,2}}{\mu_{j,2}} \leq p$ |
| {0, 1, 1} | {1, 0, 1} | $\frac{\mu_{j,2} - \mu_{k,1}}{\mu_{k,1}} \leq p$ and $\frac{\mu_{k,3} - \mu_{j,2}}{\mu_{j,2}} \leq p$ |

TABLE 1-continued

Determination of similar subarrays.

| $\eta_{m,i,j}$ | $\eta_{m,i,k}$ | $\eta_{m,i,j}$ is similar to $\eta_{m,i,k}$ if and only if: |
|---|---|---|
| {1, 1, 1} | {1, 0, 1} | $\dfrac{\mu_{j,2} - \mu_{k,1}}{\mu_{k,1}} \le p$ and $\dfrac{\mu_{k,3} - \mu_{j,2}}{\mu_{j,2}} \le p$ |

Artisans will readily note that because j and k are interchangeable, only half of the iterations are shown in the table. If all comparisons of each instance of $\eta_{m,i,j}$ and $\eta_{m,i,k}$ in a cluster set are similar, then the cluster sets are determined to be similar. In other words $\gamma_{i,j}$ is similar to $\gamma_{i,k}$, as shown in operation 706. According to embodiments, if $\eta_{m,i,j}$ and $\eta_{m,i,k}$ do not have a pattern as shown in the first two columns of Table 1, then $\eta_{m,i,j}$ is not similar to $\eta_{m,i,k}$, and $\gamma_{i,j}$ is not similar to $\gamma_{i,k}$, in operation 716. Similarly, if the conditions of the third column are not true, then $\eta_{m,i,j}$ is not similar to $\eta_{m,i,k}$, and $\gamma_{i,j}$ is not similar to $\gamma_{i,k}$, in operation 716.

However, if $\gamma_{i,j}$ is similar to $\gamma_{i,k}$ for all the comparisons for the elements for a fixed unit, then for elements $\overline{S}_j = \overline{S}_k$, i.e., element $\overline{S}_j$ is similar to element $\overline{S}_k$.

Figure 8B:
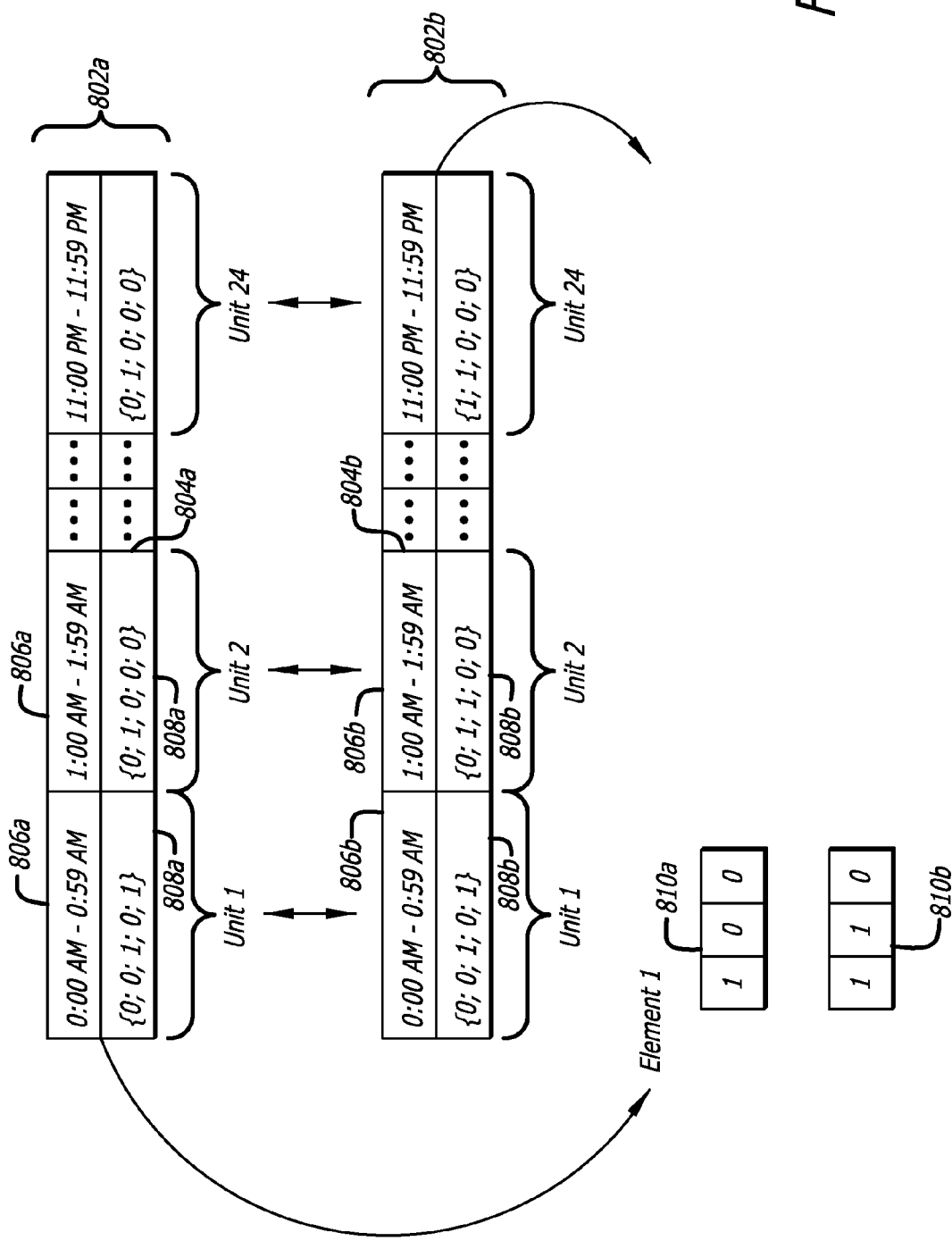
FIG. 8B is an illustration of an implementation of real time data comparison to identify similar time periods.

As illustrated according to embodiments in FIG. 8B, and example of finding similar time divisions in operation 702 (FIG. 7). According to the example in FIG. 8B, there is shown two elements 802a, 802b having 24 units 804a, 804b each. Each unit 804a, 804b comprises time interval 806a, 806b and cluster set 808a, 808b as described above. As illustrated in the example, each cluster set 808a, 808b comprises five elements corresponding to five clusters of the raw data and populated with discretized cluster data, also as described above.

As shown in unit 1 for both elements 802a, 802b, the elements of each cluster set array are the same. At element (position) 0 of each cluster set, the value is 0; at element 1 of each cluster set, the value is 0; at element 2 of each cluster set, the value is 1; at element 3 of each cluster set, the value is 0; and at element 4 of each cluster set, the value is 1. Because there is no difference in the value of each corresponding element in each array, no subarray is necessary.

In unit 2, the same process is undertaken. However, at element 3 in each cluster set array, the values diverge. In cluster set 808a, the value is 0; in the corresponding cluster set 808b, the value is 1. To determine whether the cluster sets 808a and 808b are similar despite the variant values, subarrays $\eta_{m,i,j}$ and $\eta_{m,i,k}$ are created, where m=3. Thus, the cluster set values for elements 2 (m−1) and 4 (m+1) are also used to populate the subarrays, resulting in subarrays 810a and 810b respectively. Referring to table 1, if subarray 810a ([1,0,0]) is $\eta_{m,i,j}$ and subarray 810b ([1,1,0]) is $\eta_{m,i,k}$, there is no match. However, since j and k are interchangeable, the fourth row of Table 1 produces a match when subarray 810a ([1,0,0]) is $\eta_{m,i,k}$ and subarray 810b ([1,1,0]) is $\eta_{m,i,j}$. Thus, if $$\dfrac{\mu_{j,2} - \mu_{k,1}}{\mu_{k,1}} \le p$$

is true, subarray 810a and 810b are similar.

Assume that p is 0.05, according to the example presented. Also, assume that $\mu_{j,2}$ (i.e., the median of all elements in each cluster set that correspond to element 2 in the subarray belonging to the same cluster—the median of element 3 in each cluster set belonging to the same cluster) is calculated to be 34.9. Assume that $\mu_{k,1}$ is 35.2 (i.e., the median of element 2 in each cluster set belonging to the same cluster). Then:

$$\dfrac{34.9 - 35.2}{35.2} = .009$$

Thus, because 0.009≤0.05 is true, $\eta_{m,i,j}$ is determined to be similar to $\eta_{m,i,k}$. For elements 4 and 5 of Unit 2's cluster sets, the value of each element is 0 and thus they match. Consequently, the cluster sets are determined to be identical, despite the discrepancy at element 3. The same process is repeated for each cluster set 806b and 806c. If each cluster set in elements 802a and 802b are similar, then the elements are determined to be similar. The process is repeated, so that each element is compared.

Referring again to FIG. 7, after the similar time divisions are determined in operation 702, the results are multiclustered in operation 720 in sets of matching elements, as illustrated in FIG. 9. Each multicluster will contain elements where each cluster set in the element matches each cluster set in each element of the multicluster. Otherwise expressed, $\hat{M}$ is an operator that produces sets M of identical elements ($\overline{S}_j$):

$$M = \hat{M}\overline{S}.$$

The size of each cluster is denoted as L, which will be used during the process of determining cycles.

According to embodiments, in operation 740, the multiclusters are discretized whereby a vector (i.e., an array) is created, that when applied to $\overline{S}$, contains the multicluster indexes for all j. Otherwise expressed, let $\hat{D}_s$ be a second level discretization operator. Then:

$$D_s = \hat{D}_s \overline{S}$$

$$D_s = \{d_j\}\, j=1, \ldots, N_E$$

where $d_j$ contains a value from the multicluster index and the time associated with each index j can be obtained from $\tau_j$.

As illustrated in FIG. 10, an exemplary vector is shown with the multicluster data in FIG. 9. As shown, each element is clustered into a multicluster. When second level discretization is applied, a vector (array) is formed where the multicluster index of each element populates the vector serially. For example, as shown, element 1 belongs to multicluster 1, element 2 belongs to multicluster 2, element 3 belongs to multicluster 1, element 4 belongs to multicluster x, and so forth. Thus, the vector, as shown in FIG. 10, is [1; 2; 1; x; . . . ]. The resulting vector can then be used to locate cycles.

Turning again to FIG. 7, after the multiclustering and second level discretization of the multiclustered data, the cycles are determined in operation 760. To obtain the cycles present in the collected data, a comparison is made of the discretized multicluster vector, that is $D_s$, to find similar "substrings" of length one within the vector. More generally, within the discretized multicluster vector, repeating indexes are located. Noting that the indexes each represent an element (for example 1 day) and that matching indexes represent matching or similar sets of data (because of the multiclustering), cycles within the vector indicate periods where data trends repeat.

To locate these pattern or cycles, repeating period ω is located in the discretized multicluster vector. A cycle period ω from a starting index k exists if in $D_s$ at positions k+(i*w) at least v % of elements have the same multicluster index value ($d_k$), where $$i = 0, 1, \ldots, \text{div}\left(\frac{L-k}{\omega}\right)$$

and $\omega=1, \ldots, L/3$. Artisans will readily note that the div operator returns an integer value by ignoring any remainder.

Alternately stated, operator $\hat{\psi}$ is applied to set $D_s$ to output a set of cycles $\overline{\psi}$, each cycle being denoted by $\xi_l$:

$$\overline{\psi} \equiv \hat{\psi} D_s$$

$$\overline{\psi} = \{\xi_l\} \; l=0, \ldots, N_\psi$$

$$\xi_l = (\omega_l, k_l, d_{k_l})$$

Where $\omega_l$ is the period length, $k_l$ is the starting index, $d_{k_l}$ is the value of the multicluster index in the vector. Note that $N_\psi$ denotes the total number of cycles determined.

Figure 11:
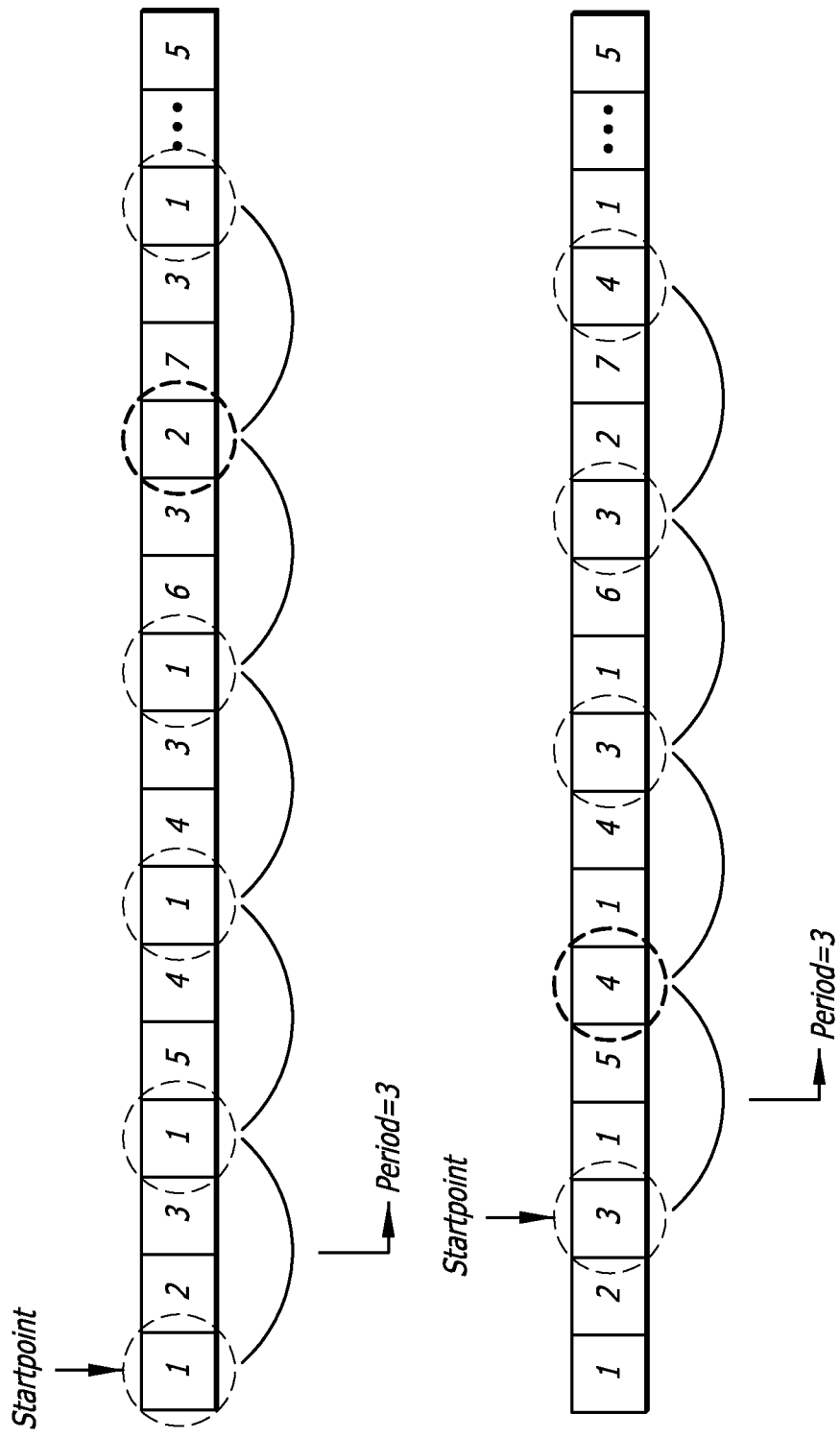
FIG. 11 is an illustration of an implementation of a method of determining cycles from multiclusters of similar time-series data.

For example, according to exemplary embodiments illustrated in FIG. 11, there is shown a discretized multicluster vector shown in two iterations. As shown, the process of cycle determination is performed on each discretized multicluster vector ($D_s$). In the topmost example, the starting index is k=1. As will be observed in this example, $d_k=1$ (i.e., the multicluster index for the cycle being determined is 1). Also observed, the cycle period is $\omega=3$ because the multicluster index is repeated every three array positions. All permutations of starting index and cycle period $\omega=1, \ldots, L/3$ are tested on the discretized multicluster index to locate potential cycles, according to embodiments.

Each $d_k$, according to the process, must be the same at each k+(i*w) for $$i = 0, 1, \ldots, \text{div}\left(\frac{L-k}{\omega}\right)$$

and period $\omega=3$. In this case assume that L for $d_k=1$ is 20 elements, then i=0, 1, 2, 3, 4, 5, 6. i.e., $$i = \text{div}\left(\frac{20-1}{3}\right) = \text{div}\left(\frac{19}{3}\right) = \text{div}\left(6\frac{1}{3}\right) = 6.$$

Artisans will readily observe that for multicluster index 1 ($d_k=1$), the following periods will be observed for cycles: $\omega=1, \ldots, L/3=1, \ldots, 20/3=1, 2, 3, 4, 5, 6, 7$.

However, it will be noted at the $4^{th}$ cycle, the multicluster index is 2 rather than one. Occasionally, for every "real" cycle, the multicluster index will not match, indicating that the elements didn't match when compared. However, according to the methods disclosed herein, such variance is expected and the cycle will be detected assuming v % of the multicluster indexes ($d_k$'s) are the same. For example, if v=80%, then the cycle of period 3 detected in the topmost discretized multicluster array will be determined to be a real cycle because 5 of 6 of the $d_k$'s match (i.e., five of six of the multicluster indexes were 1, and one of six indexes were 2). Thus, because 83% of the multicluster indexes were 1, and because 83% is greater than the 80% threshold, cycle $\xi_1 \equiv (3, 1, 1)$ is determined.

Likewise in the bottommost array in FIG. 11, a cycle is being determined for $d_k=3$. In this case, the starting index is k=3, and the period is $\omega=3$. In this case, multicluster index is observed at array positions 3, 9, 12, but not at array positions 6 and 15. Assuming against, v=80%, in this case no cycle would be determined because only ⅗ (of the shown array positions at $\omega=3$) have index value $d_k=3$, which is less than the required 80% to determine a cycle.

The set $\overline{\psi}$ is defined to contain all the possible cycles available in $D_s$. However, redundant cycle information may be present. For example, a cycle of length $\omega=3$ may also be part of $\overline{\psi}$ as cycles of length $\omega=6$, $\omega=9$, etc. because they are multiples of each other. According to embodiments, the redundant cycle information is reconciled in operation 780 of FIG. 7 to determine which representation most accurately reflects the actual cycle.

Figure 12:
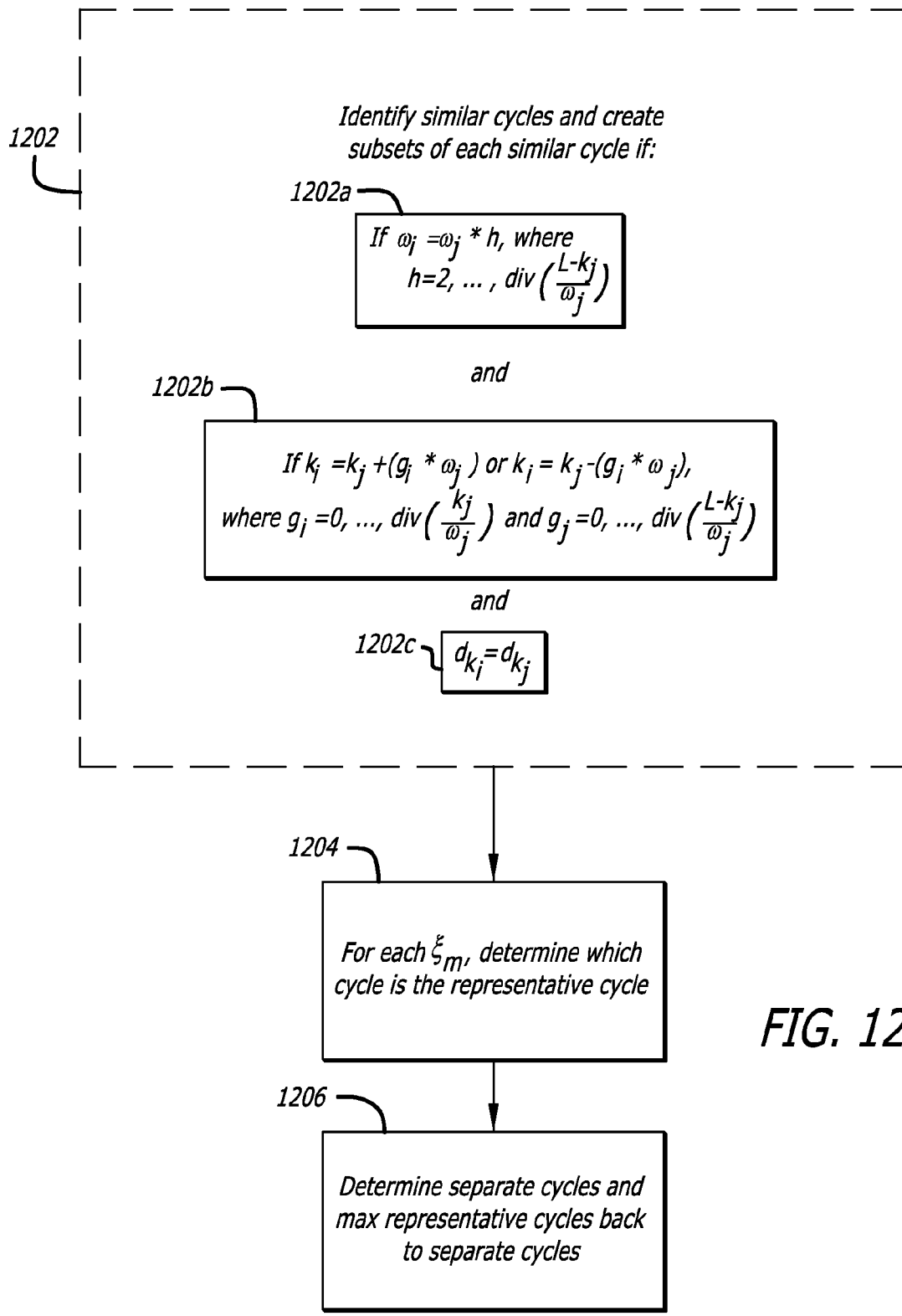
FIG. 12 is a flow diagram of an implementation of a process for cycle reduction.

According to embodiments and as illustrated in FIG. 12, the process of cycle reduction is broken down in to three steps: identification of similar cycles and creation of subsets of each similar cycle in operation 1202 and for each similar cycle, determination of the representative cycle in operation 1204. In operation 1206, separate cycles are determined, optimized, and the representative cycle is applied to each separate cycle.

According to embodiments and with respect to the identification of similar cycles and creation of subsets of each similar cycle in operation 1202, three conditions each must be met. One condition that must be met for two cycles to be similar to each other is the periods of each must be integer multiples of each other in operation 1202a. Alternately expressed:

if $\omega_i = \omega_j * h$, where $$h = 2, \ldots, \text{div}\left(\frac{L-k_j}{\omega_j}\right).$$

Another condition that must be met is that the starting indexes of two cycles starting at different starting indexes must maintain the period $\omega$ away from the respective starting indexes, even when the starting points are shifted by a fraction of $\omega$. According to embodiments, there are two possible cases:

a) $k_i < k_j$ and $\omega_i < \omega_j$, where $k_i$ and $k_j$ are the cycle start points, and $\omega_i$ and $\omega_j$ are the period of the cycles. For this case, the following condition must be met:

$$\text{mod}\left(\frac{k_j - k_i}{\omega_i}\right) = 0;$$

b) $k_i > k_j$ and $\omega_i < \omega_j$, where $k_i$ and $k_j$ are the cycle start points, and $\omega_i$ and $\omega_j$ are the period of the cycles. For this case, the following condition must be met:

$$\text{mod}\left(\frac{k_i - k_j}{\omega_i}\right) = 0;$$

Artisans will readily note that the mod operator (modulo operator) returns a remainder that is the result of a division operation.

According to embodiments, the same process is also expressed in operation 1202b:

if $k_i = k_j + (g_j * \omega_j)$ or $k_i = k_j - (g_i * \omega_j)$, where $g_i = 0, \ldots, \text{div}\left(\frac{k_j}{\omega_j}\right)$ and $g_j = 0, \ldots, \text{div}\left(\frac{L-k_j}{\omega_j}\right).$ Another condition that must be met is that the discretized multicluster index of one cycle must be the same as the discretized multicluster index of the other cycle in operation 1202c. Alternately expressed:

$$d_{k_i}=d_{k_j}.$$

The entire operation 1202 of FIG. 12 can be encapsulated into operator $\overline{Y}$, which when applied to $\overline{\psi}$ produces a series of subsets of similar cycles.

$$\overline{Y}=\hat{Y}\overline{\psi}$$

$$\overline{Y}=\{\overline{\xi}_m\}\ m=1,\ldots,L_c$$

$$\overline{\xi}_m=\{\overline{\xi}_l\}$$

where $L_c$ is the total number of similar cycles obtained and index l refers to the given cycles index. Note that:

$$\overline{Y}=\bigcup_{m=1}^{L_c}\overline{\xi}_m$$

For example, as illustrated in FIG. 13, two exemplary cycle lengths are shown, for ω=7 and ω=14. Observing the cycles and the multiclusters, it is observed that days 1 and 2 of ω=7 correlate with multicluster index 1, while the rest correlate with multicluster index 3. In the cycles determined for ω=14, days 2, 3, 9, and 10 correlate with multicluster index 1, while the rest again correlate with multicluster index 3.

Two sets of similar cycles are observed. Recalling that for cycles to be similar they must have periods that are integer multiples of each other, the starting indexes of two cycles starting at different starting indexes must maintain the period ω away from the respective starting indexes, and the multicluster index values must be the same. Starting with the third criteria where $d_k=1$, it is observed that two cycles have a period ω=7 and four have a period of ω=14. Because 14 is two times 7, the first criteria is also satisfied regarding the similarity of all the cycles having $d_k=1$. Similarly, the second criteria is met because the cycles maintain ω=7 and ω=14, respectively, whether they start on day 1, 2 for ω=7 or 2, 3, 9, or 10 for ω=14. Consequently, days 1 and 2 where ω=7 are groups together; also grouped in that group are days 2, 3, 9, and 10 from the ω=14 because although they have different starting indexes, each of the three criteria are satisfied for these data as well.

After identification of the similar cycles and creation of the subsets of the similar cycles ($\overline{\xi}_m$), a representative cycle is chosen. The representative cycle is determined by defining, according to embodiments, a period weight ($W_j$) that is used to determine the representative cycle by selecting the cycle with the highest period weight. $W_j$ is calculated by:

$$W_j \equiv \frac{n_{w_j}}{\omega_j}$$

where $n_{w_j}$ is the number of cycles in $\overline{\psi}$ with a cycle of $\omega_j$. The cycle with the highest period weight is selected as the representative period. If multiple cycles have the same period weight, then the cycle with the smallest ω is chosen.

According to other embodiments, a cycle with the shortest period may be selected as the representative cycle.

Figure 14:
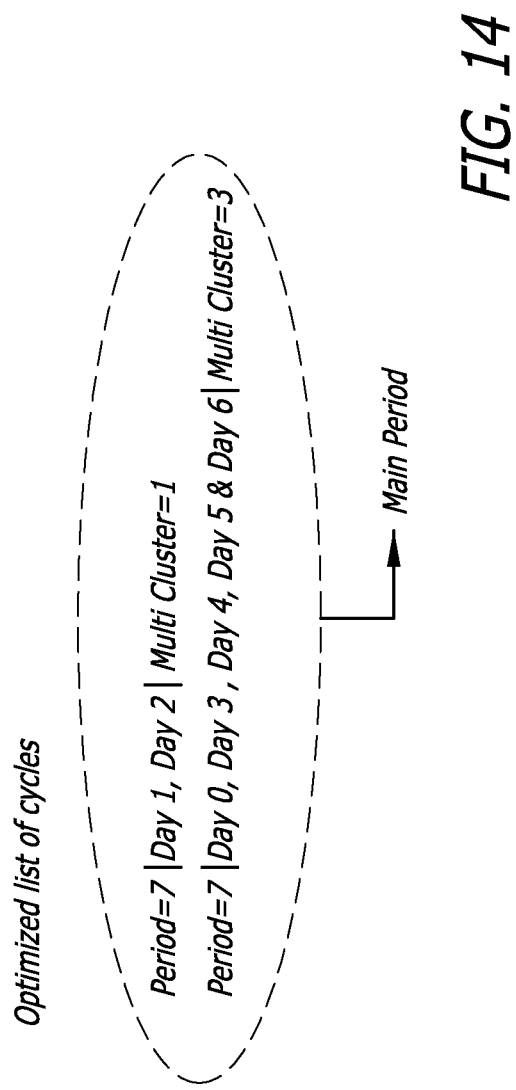
FIG. 14 is an illustration of an implementation of optimized cycles determined using the methods of the present disclosure.

After the representative cycle is chosen, and as illustrated in FIG. 14, separate cycles are determined (operation 1206 of FIG. 12), for example those having the same multicluster index, same period, but different starting indexes, and the representative cycle is applied to each of those cycles. For example, in the exemplary example shown in FIGS. 13 and 14, days 1 and 2 of ω=7 and days 2, 3, 9, and 10 of ω=14 are grouped together as similar groups. However, these form two disparate cycles—one starting on day 1 and one starting on day 2. Artisans will readily recognize that the cycles in ω=14 are the same as and belong to one of day 1's cycle or day 2's cycle. These different cycles are differentiated, but once the representative cycle is decided, for example $\xi_{rep}=$ (7, 1, 1) (i.e., period of 7, starting index of 1, and multicluster set of 1), that cycle is applied to both day 1 and day 2, as illustrated in FIG. 14. Likewise with the other cycles determined for multicluster 3: the are decided to be similar, a representative cycle is decided and applied to each disparate cycle in the group.

The result of the processes disclosed herein detects cycles in the data from which thresholds or other uses may be made. For example, by knowing the expected behavior based on the cycles determined, appropriate thresholds may be determined and applied on a time period by time period basis depending on which cycle the time period belongs.

The process and methods described herein can be stored in a memory of a computer system as a set of instructions to be executed. In addition, the instructions to perform the processes described above could alternatively be stored on other forms of machine-readable media, including magnetic and optical disks. For example the processes described could be stored on machine-readable media, for example magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.)

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method that detects and records patterns in a data set stored in one or more physical data-storage devices within a computer system, the computer system controlled to carry out the method by execution of computer instructions stored in a memory of the computer system, the method comprising:

clustering a data set comprising multiple data-point/time-point pairs into one or more clusters, each cluster associated with a cluster index and each data point contained in a single cluster;

generating a discretized data set by replacing each data point of each data-point/time-point pair within the data set with a cluster index for the cluster that contains the data point;

for each large time interval of an ordered set of contiguous large time intervals, dividing the large time interval into small time intervals and storing, for each small time interval, an indication, for each cluster, of whether or not the discretized data set includes an index for the cluster associated with a time point in the small time interval;

clustering large time intervals into large-time-interval clusters, each large-time-interval cluster associated with a large-time-interval-cluster index;

constructing an ordered set of discretized large time intervals by replacing each large time interval in the ordered set of large time intervals with a large-time-interval-cluster index for the large-time-interval cluster that contains the large time interval;

identifying at least one periodic occurrence of large-time-interval-cluster indexes in the ordered set of discretized large time intervals; and storing an indication of the identified periodic occurrence in a physical data-storage device.

2. The method of claim 1 where the discretized data set comprises multiple cluster-index/time-point pairs.

3. The method of claim 1 where the ordered set of contiguous large time intervals is obtained by dividing a time range, the time range equal to or including a time period that begins with the earliest time point and that ends with the latest time point, into a set of equal-length contiguous large time intervals.

4. The method of claim 1
wherein the indication for a particular cluster and for a particular small time interval has one of two values selected from among:
a first value indicating that the discretized data set includes the cluster index for the cluster in association with the time point in the small time interval,
a second value indicating that the discretized data set does not include the index for the cluster in association with the time point in the small time interval; and
wherein the second value is different from the first value.

5. The method of claim 1, wherein the large time interval is a day and the small time interval is an hour.

6. The method of claim 1, wherein clustering large time intervals into large-time-interval clusters further comprises assigning, to each large-time-interval cluster, a set of pairwise matching large-time-intervals.

7. The method of claim 6, wherein a first large time interval matches a second large time interval when the small-time-interval indications within the first large time interval are identical to the small-time-interval indications within the second large time interval or when each of those small-time-interval indications within the first large time interval that are not identical to corresponding small-time-interval indications within the second large time interval have greater than a threshold similarity to one another.

8. The method of claim 1 wherein identifying at least one periodic occurrence of large-time-interval-cluster indexes in the ordered set of discretized large time intervals further comprises:
identifying cycles in the ordered set of discretized large time intervals, each cycle associated with a period value, a starting index, and a large-time-interval-cluster index;
determining sets of related cycles from the identified cycles; and
for each set of related cycles
calculating a period weight for each cycle, and
identifying a representative cycle with a highest period weight.

9. The method of claim 8 wherein identifying cycles in the ordered set of discretized large time intervals further comprises:
identifying an ordered set of a first number of large time intervals at a particular period within the ordered set of discretized large time intervals;
identifying a second number of large time intervals within the identified first number of large time intervals that have a common large-time-interval-cluster index;
computing a ratio of the second number to the first number; and
determining whether or not the computed ratio is greater than a threshold.

10. The method of claim 8 wherein one cycle is related to another cycle when
the period of one cycle is an integer multiple of the period of another cycle;
the large-time-interval-cluster indexes of the two cycles are the same; and
the starting indexes of the two cycles starting at different starting indexes are separated by one of the periods.

* * * * *